United States Patent
Zhao et al.

(10) Patent No.: US 10,399,440 B2
(45) Date of Patent: Sep. 3, 2019

(54) METHODS AND SYSTEM FOR REGENERATIVE HYBRID VEHICLE BRAKING

(71) Applicant: Ford Global Technologies, LLC, Dearborn, MI (US)

(72) Inventors: Yanan Zhao, Ann Arbor, MI (US); Ming Lang Kuang, Canton, MI (US); Xiaoyong Wang, Novi, MI (US); Dale Scott Crombez, Livonia, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 15/624,382

(22) Filed: Jun. 15, 2017

(65) Prior Publication Data

US 2018/0361856 A1 Dec. 20, 2018

(51) Int. Cl.
| B60W 20/14 | (2016.01) |
| B60L 7/26 | (2006.01) |
| B60L 7/18 | (2006.01) |
| B60T 8/1761 | (2006.01) |
| B60T 1/10 | (2006.01) |

(52) U.S. Cl.
CPC .................. B60L 7/26 (2013.01); B60L 7/18 (2013.01); B60T 1/10 (2013.01); B60T 8/1761 (2013.01); B60W 20/14 (2016.01); *B60L 2240/423* (2013.01); *B60L 2240/465* (2013.01); *B60T 2270/604* (2013.01); *B60T 2270/606* (2013.01); *Y10S 903/947* (2013.01)

(58) Field of Classification Search
CPC ........ B60L 7/26; B60L 7/18; B60L 2240/465; B61L 27/0027; B60W 20/14; B60T 1/10; B60T 2270/606; B60K 3/00; B60K 17/3467; Y01S 903/947
See application file for complete search history.

(56) References Cited

U.S. PATENT DOCUMENTS

| 4,360,222 A | * | 11/1982 | Fisher | .................. B60K 3/00 180/302 |
| 5,511,859 A | | 4/1996 | Kade et al. | |

(Continued)

FOREIGN PATENT DOCUMENTS

CN 102336142 A 2/2012

OTHER PUBLICATIONS

Wei et al., Braking force control strategy for electric vehicles with load variation and wheel slip considerations, 2016, IEEE, p. 41-47 (Year: 2016).*

(Continued)

*Primary Examiner* — McDieunel Marc
(74) *Attorney, Agent, or Firm* — David Kelley; McCoy Russell LLP

(57) ABSTRACT

Methods and systems are provided for operating a hybrid vehicle during operating conditions where vehicle braking is requested. In one example, regenerative braking is permitted during conditions of wheel slip so that a greater portion of a vehicle's kinetic energy may be recovered and stored as electrical energy. Additionally, in some examples, the amount of regenerative braking is adjusted responsive to a torque of a differential clutch during wheel slip conditions.

20 Claims, 7 Drawing Sheets

(56) References Cited

U.S. PATENT DOCUMENTS

| | | | |
|---|---|---|---|
| 5,707,115 | A | 1/1998 | Bodie et al. |
| 6,203,465 | B1 * | 3/2001 | Showalter .......... B60K 17/3467 |
| | | | 475/204 |
| 7,654,620 | B2 | 2/2010 | Jeon et al. |
| 8,788,144 | B2 | 7/2014 | Krueger et al. |
| 8,862,358 | B2 | 10/2014 | Bayar et al. |
| 9,457,777 | B2 | 10/2016 | Gabor et al. |
| 9,493,075 | B2 | 11/2016 | Crombez et al. |
| 2007/0108838 | A1 | 5/2007 | Shaffer et al. |
| 2008/0116743 | A1 | 5/2008 | Jeon et al. |
| 2016/0009304 | A1 * | 1/2016 | Kumar ................ B61L 27/0027 |
| | | | 701/19 |
| 2019/0111790 | A1 * | 4/2019 | Crombez ................ B60T 8/268 |

OTHER PUBLICATIONS

Wang et al., A robust wheel slip control design for in-wheel-motor-driven electric vehicles with hydraulic and regenerative braking systems, 2014, IEEE, p. 3225-3230 (Year: 2014).*

Sakamoto et al., Cooperative control of full electric braking system with independently driven four wheels, 2006, IEEE, p. 602-606 (Year: 2006).*

Spichartz et al., Comparison of electric vehicles with single drive and four wheel drive system concerning regenerative braking, 2017, IEEE, p. 1-7 (Year: 2017).*

Kullignsjo et al., The possibility for energy regeneration by electrification in Swedish car driving, 2013, Internet, p. 1-7 (Year: 2013).*

* cited by examiner

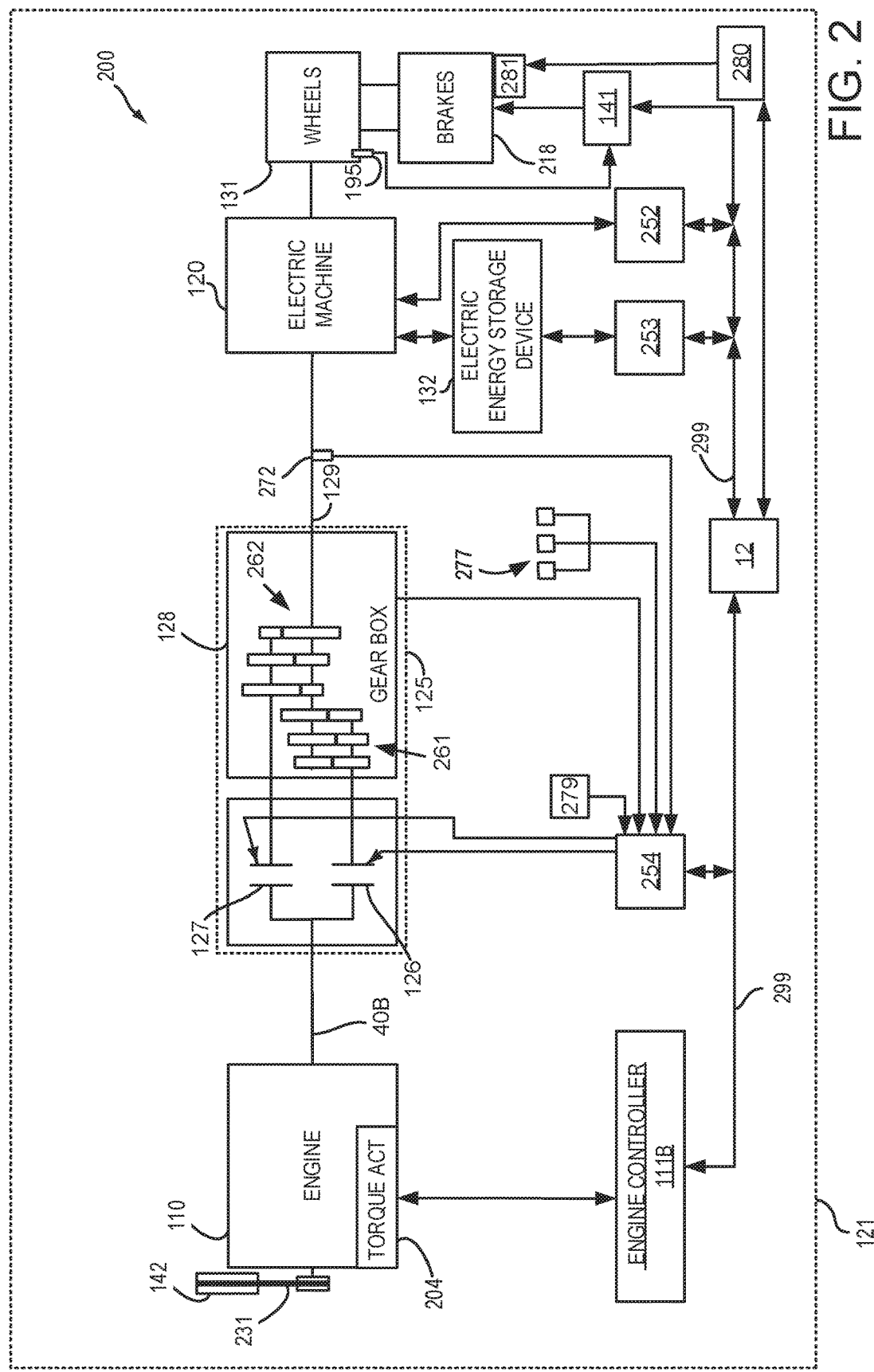

METHODS AND SYSTEM FOR REGENERATIVE HYBRID VEHICLE BRAKING

FIELD

The present description relates generally to methods and systems for controlling regenerative braking of a hybrid vehicle. The methods and systems may be particularly useful for hybrid vehicles that operate during conditions where wheel slip may occur.

BACKGROUND/SUMMARY

A hybrid vehicle may convert a vehicle's kinetic energy into electrical energy via regenerative braking. The electrical energy may be stored in an electrical energy storage device until it is subsequently used to propel the vehicle. For example, electrical energy stored during vehicle braking may be subsequently used to launch the vehicle or to increase vehicle performance during high vehicle load conditions. However, during some conditions, regenerative braking may be temporarily deactivated in favor of friction braking. For example, regenerative braking may be deactivated and friction braking may be activated during conditions when wheel slip is detected while the vehicle is braking. Deactivating regenerative braking may simplify vehicle braking; however, a portion of the vehicle's kinetic energy may be lost to heat instead of being preferentially converted into electrical energy that may be stored for subsequent use. As a result, the vehicle's driving range may be reduced.

The inventors herein have recognized the above-mentioned issues and have developed a vehicle operating method, comprising: reducing speed of a first wheel via regenerative braking and friction braking; and reducing the friction braking of the first wheel in response to slip of the first wheel without reducing the regenerative braking of the first wheel.

By prioritizing regenerative braking over friction braking during some conditions, it may be possible to control vehicle wheel slip while converting a vehicle's kinetic energy into electrical power. Further, friction brakes may augment regenerative braking during conditions of wheel slip when regenerative braking capacity may be limited. The regenerative braking may be adjusted responsive to two different wheel torques so that slip for individual wheels may be controlled. The electrical energy generated during regenerative braking may be used at a later time to propel the vehicle and conserve fuel.

The present description may provide several advantages. In particular, the approach provides torque control for each wheel coupled to an axle. The torque may be controlled via friction braking or an electric machine. Further, the approach adjusts friction braking responsive to regenerative braking so that a desired wheel torque may be provided while at least one wheel of a vehicle is slipping. In addition, the approach compensates wheel torque control during conditions where regenerative braking may be limited because unusual vehicle operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is a schematic diagram of the hybrid vehicle driveline including controllers of various driveline components;

DETAILED DESCRIPTION

Figure 4:
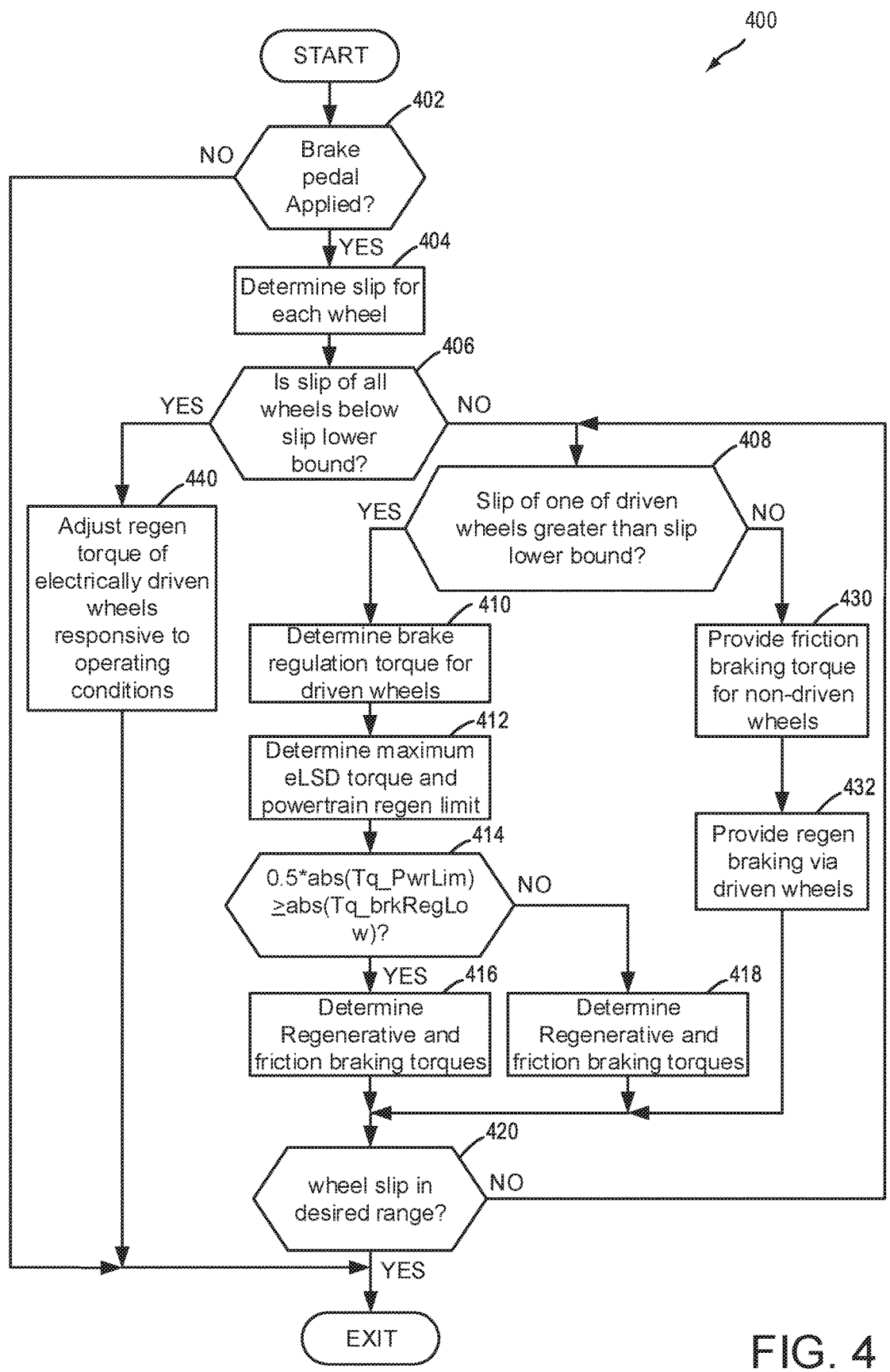
FIG. 4 shows a flowchart of a method for controlling braking of a hybrid vehicle.
Figure 5:
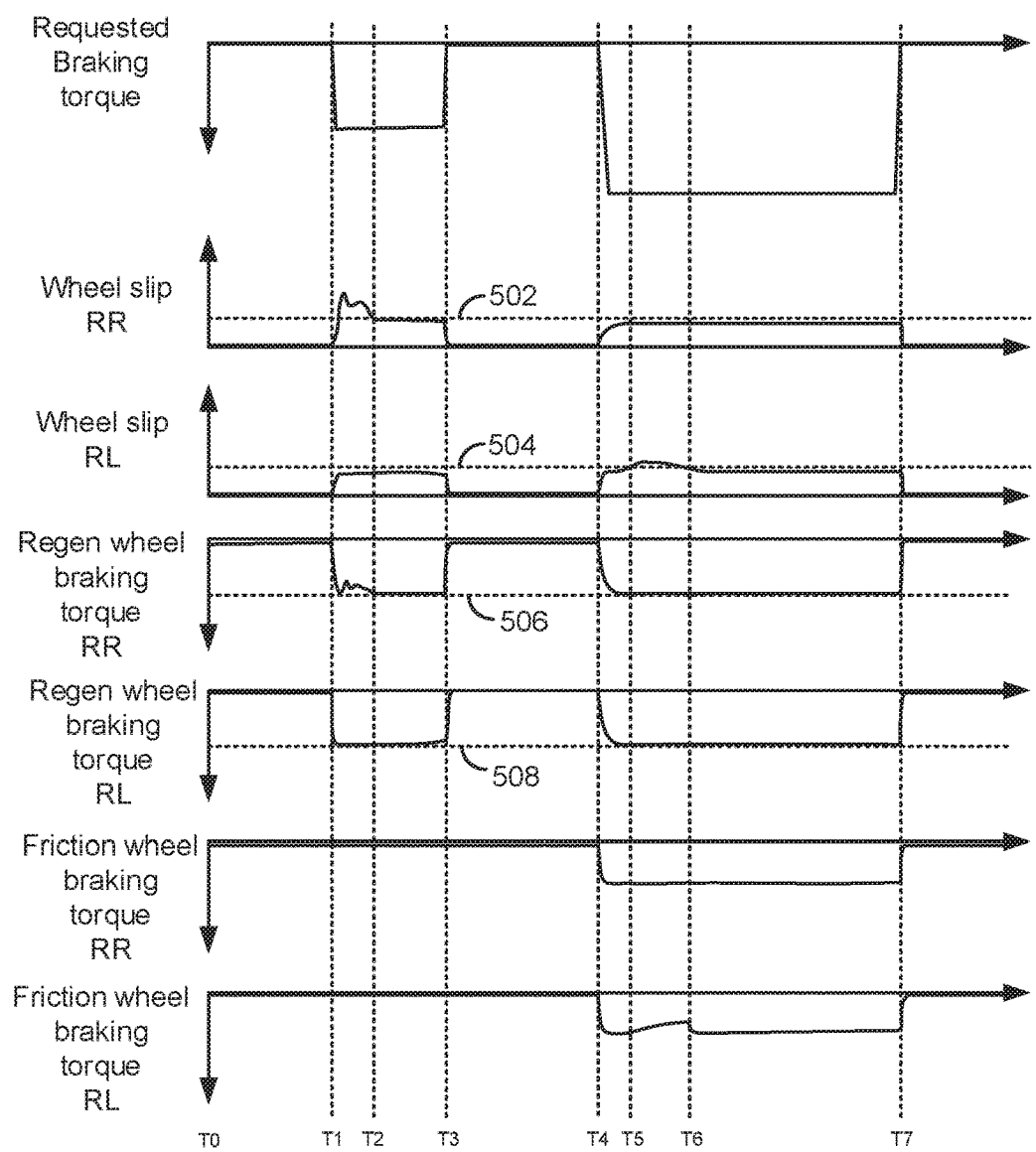
FIG. 5 shows prophetic vehicle operating sequence according to the method of FIG. 4.

The following description relates to systems and methods for operating a driveline of a hybrid vehicle. FIGS. 1A-3 show an example hybrid vehicle system that includes a driveline with an internal combustion engine, an integrated starter/generator, a dual clutch transmission, and an electric machine that may be operated in a regeneration mode to store a vehicle's kinetic as electrical energy. FIG. 4 shows a method for controlling hybrid vehicle braking, and the method includes compensating for vehicle wheel slip. FIG. 5 shows an example vehicle operating sequence according to the method of FIG. 4.

Figure 1A:
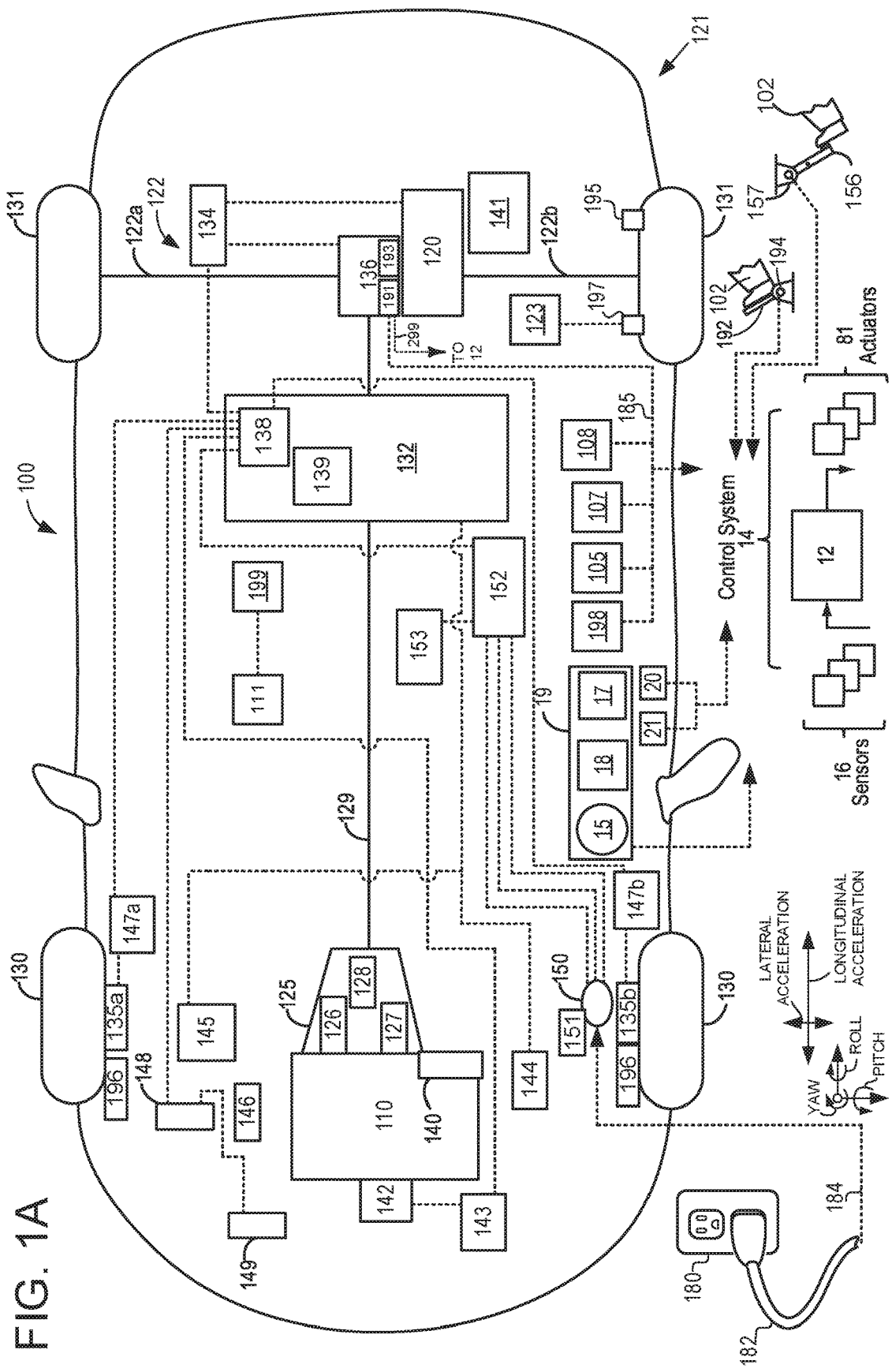
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. In this example, front wheels 130 are not driven and rear wheels 131 are driven electrically or via engine 110. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Friction brakes 196 may be applied to slow front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130 as shown in FIG. 1C.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
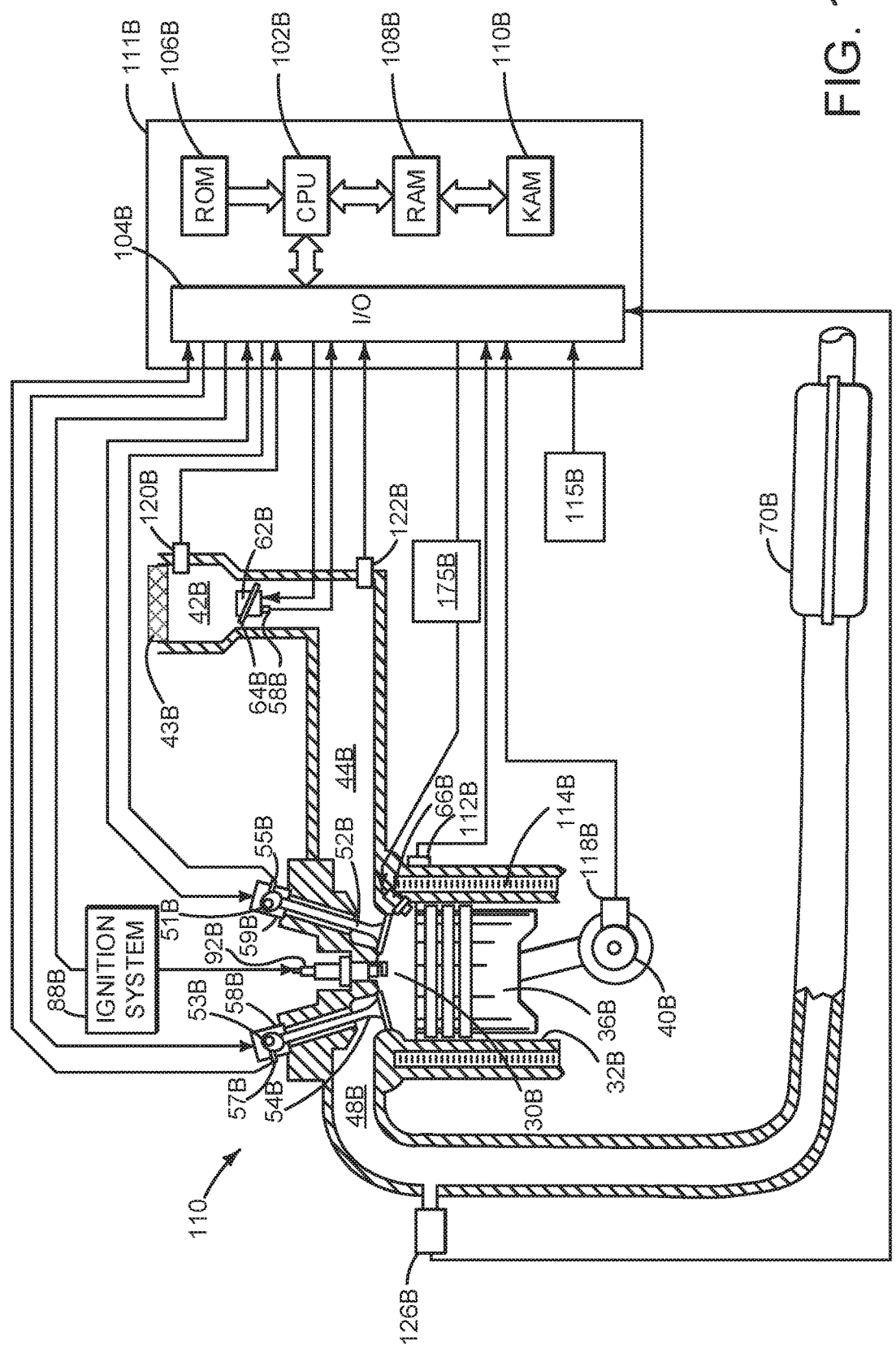
FIG. 1B is a sketch of an engine of the hybrid vehicle driveline.
Figure 1C:
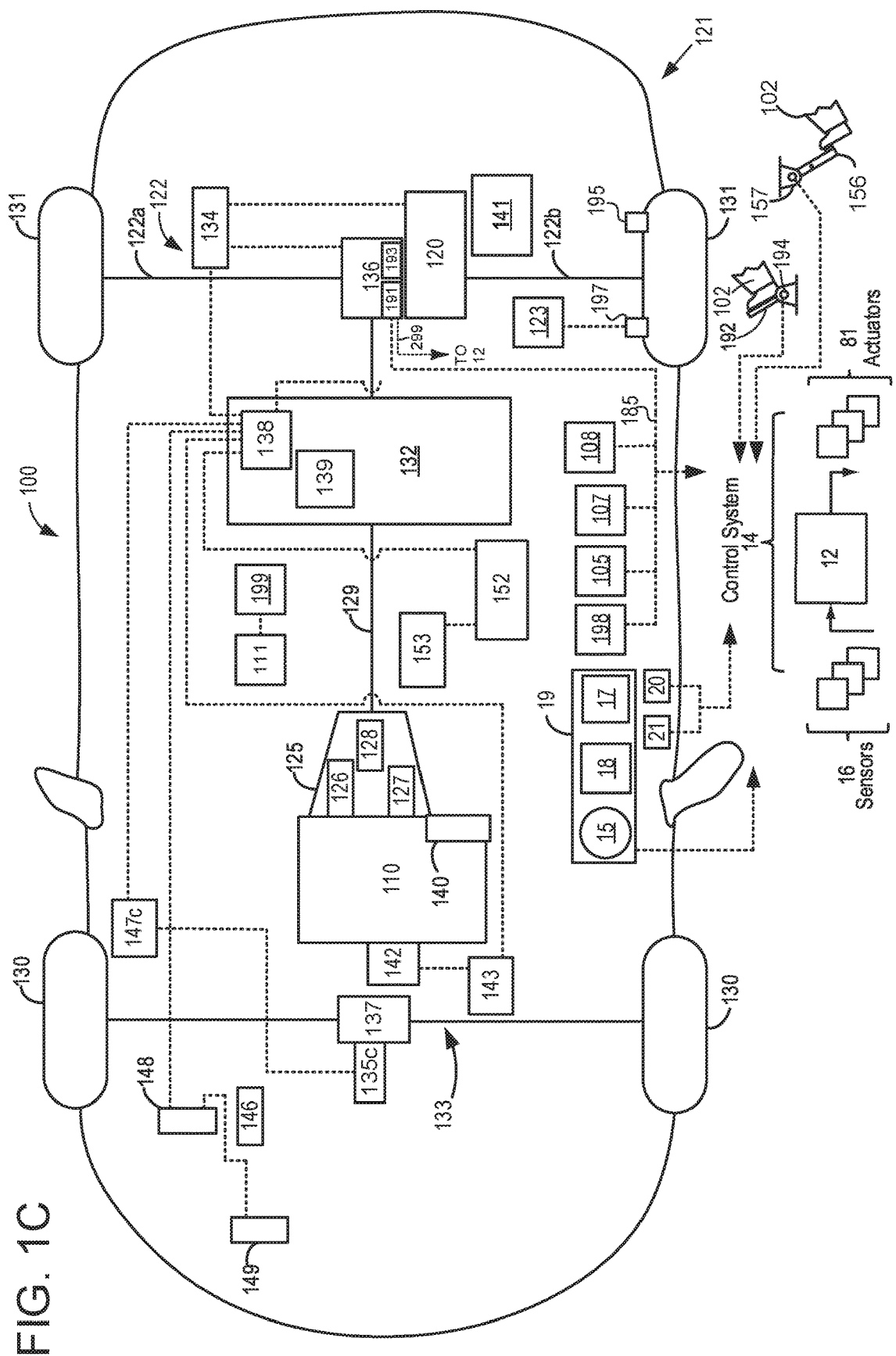
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130 via front drive unit 137, which may include a differential. In some examples, the electric machine 135c and the front drive unit 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. The other components shown in FIG. 1C may operate as previously described.

FIG. 2 is a block diagram of vehicle 121 including a powertrain or driveline 200. The powertrain of FIG. 2 includes engine 110 shown in FIGS. 1A-1C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the brake regulation torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
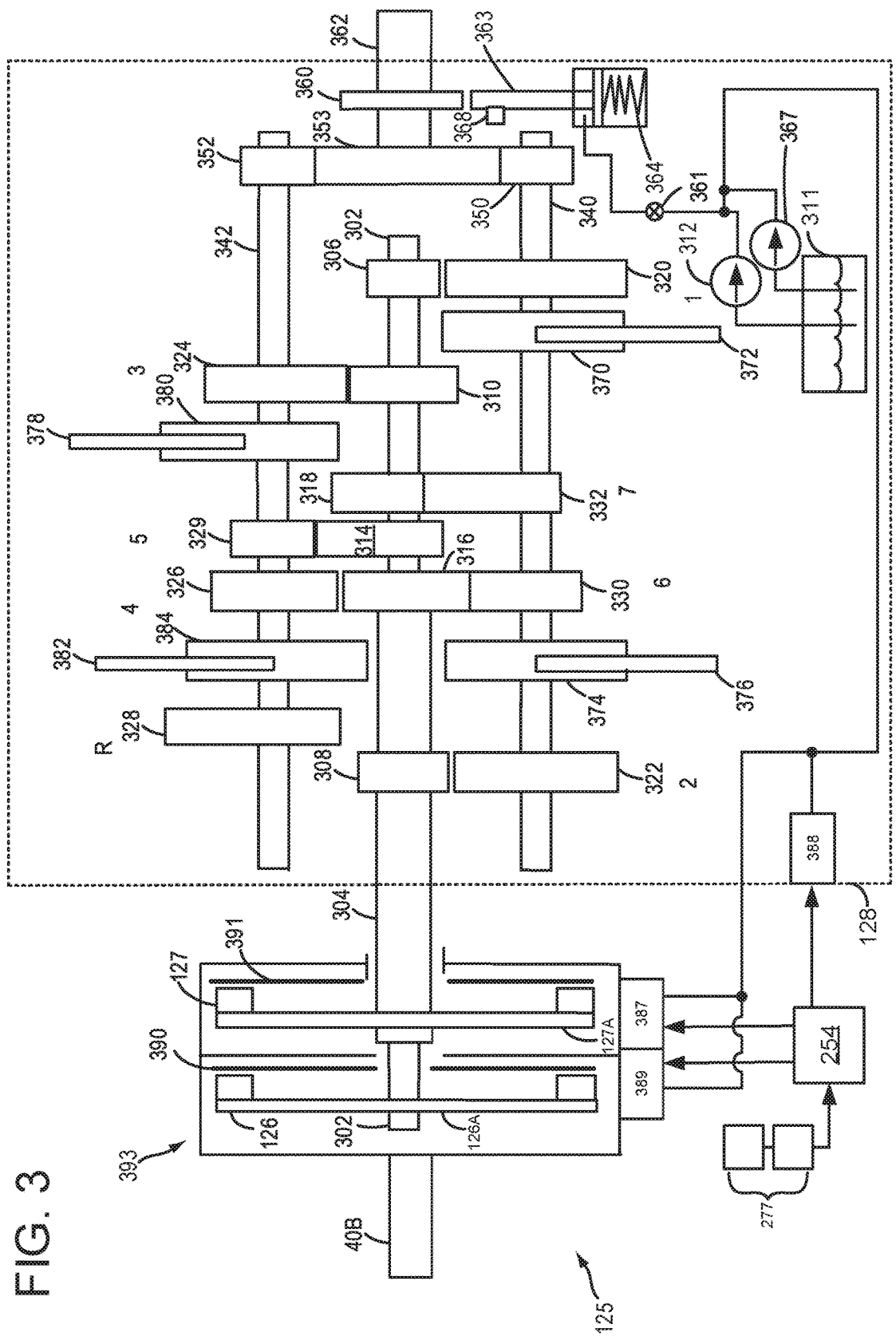
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIG. 4, an example method for operating a hybrid driveline to improve driveline efficiency via regeneration is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world. The friction braking torques and regenerative braking torques described in the method of FIG. 4 may be applied to reduce speed of a wheel.

At 402, method 400 judges if a vehicle brake pedal is applied. Method 400 may judge that the brake pedal is applied in response to a position of the brake pedal as determined via a brake pedal position sensor. If method 400 judges that the brake pedal is applied, the answer is yes and method 400 proceeds to 404. Otherwise, the answer is no and method 400 proceeds to exit.

At 404, method 400 determines a slip amount for each vehicle wheel. In one example, method 400 determines slip for a wheel in response to present vehicle speed and a present speed of the wheel. Present vehicle speed may be determined from transmission output shaft speed, electric motor speed, and/or wheel speed. Wheel slip may be determined by subtracting what wheel speed would be at the present vehicle speed from the measured wheel speed. Slip for each wheel may be determined in this way. In other examples, wheel slip and vehicle speed may be determined in other ways known in the art. For example, wheel slip= $(V-Re*w)/V$, where V is longitudinal speed of the wheel center, w is angular speed of the tire, Re is tire rolling radius. Method 400 proceeds to 406 after determining vehicle speed and an amount of wheel slip for each wheel.

At 406, method 400 judges if slip of all wheels below a slip threshold or lower bound. If slip of each vehicle wheel is less than the threshold amount of slip, the answer is yes and method 400 proceeds to 440. Otherwise, the answer is no and method 400 proceeds to 408.

At 408, method 400 judges if slip of one of the electrically driven wheels (e.g., a wheel that is provided torque via an electric machine) is greater than the slip lower bound or threshold. If slip of one of the vehicle's driven wheels is greater than the slip lower threshold, then the answer is yes and method 400 proceeds to 410. Otherwise, the answer is no and method 400 proceeds to 430.

At 410, method 400 determines a regulation torque for driven wheels (e.g., wheels that are provided torque via an engine or electric machine). In one example, the left rear and right rear are driven wheels. In other examples, the front left and right wheels and the rear wheels may be driven. The brake regulation torque may be determined as is known in the art. In one example, the brake regulation torque of a wheel is a function of the wheel's present slip, a desired slip range of the wheel, and desired deceleration of the wheel. The regulated braking torque may be calculated or retrieved from empirically determined values stored in controller memory that is referenced by the wheel's present slip, the desired slip range of the wheel, and the desired deceleration of the wheel.

The lower value of the right rear wheel regulation torque Tq_brkRegRR and the left rear wheel regulation torque Tq_brkRegRL is determined via the following equation:

$$Tq\_brkRegLow=max(Tq\_brkRegRR,Tq\_brkRegRL)$$

where Tq_brkRegLow is the lower value of the right and left rear wheel regulation torques or the lower regulated braking torque, max is a function that returns the greater value of the two arguments Tq_brkRegRR and Tq_brkRegRL, and where the right and left rear wheel regulation torques are negative. The higher valve of the right rear wheel regulation torque and the left rear wheel regulation torque is determined via the following equation:

$$Tq\_brkRegHig=min(Tq\_brkRegRR,Tq\_brkRegRL)$$

where Tq_brkRegHig is the higher value of the right and left rear wheel regulation torques or the higher regulated braking torque, min is a function that returns the higher value of the two arguments Tq_brkRegRR and Tq_brkRegRL, and where the rear right Tq_brkRegRR and rear left Tq_brkRegRL wheel regulation torques are negative.

Method 400 then determines a difference between the lower and higher regulation braking torques via the following equation:

$$Tq\_diffReg=Tq\_brkRegHig-Tq\_brkRegLow$$

where Tq_diffReg is the difference in torque between the lower and higher regulation braking torques. Method 400 proceeds to 412.

At 412, method 400 determines a maximum or upper threshold electrically controlled limited slip differential torque or a maximum or upper threshold torque the electrically controlled limited slip differential may transfer Tq_eLSDPot. In one example, the maximum electrically controlled differential torque maximum threshold is a maximum or threshold amount of torque the electrically controlled differential clutch may transfer. It may also be described as a clutch torque capacity. The clutch torque of the electrically controlled differential clutch may be varied from a value of zero to a rated capacity. The clutch torque may be estimated as a function of closing force applied to the differential clutch. The clutch torque function may be stored in non-transient controller memory and indexed or referenced via clutch closing force. The function outputs an empirically determined value.

Method 400 also determines a maximum or threshold regeneration power limit Tq_PwrLim for the driveline. The regeneration power limit may be a function of battery state of charge and electric machine temperature. The regeneration power limit function may be stored in non-transient controller memory and it may be referenced by battery state of charge and electric machine temperature. The regeneration power limit function outputs an empirically determined driveline regeneration power limit. Method 400 proceeds to 414.

At 414, method 400 judges if there is regenerative capacity to meet the brake regulation torque. In particular, method 400 applies the following equation to make the judgement:

$$0.5*abs(Tq\_PwrLim)>abs(Tq\_brkRegLow)$$

where Tq_PwrLim is the maximum or threshold regeneration power limit for the driveline, Tq_brkRegLow is the lower value of the right and left rear wheel regulation torques, and abs is a function that returns an absolute value of the argument Tq_PwrLim or Tq_brkRegLow as indicated. If the value of 0.5*abs(Tq_PwrLim) is greater than or equal to the value of abs(Tq_brkRegLow), then the answer is yes and method 400 proceeds to 416. Otherwise, the answer is no and method 400 proceeds to 418.

At 416, method 400 determines the regenerative braking torques and the friction braking torques. Because the answer at step 414 was yes, there is sufficient regenerative capacity to provide the requested braking level via at least one of the electrically driven wheels without applying friction brakes. Method 400 adjusts a regenerative braking torque for one wheel using the following equation:

$$Tq\_regenReq\_1=Tq\_brkRegLow$$

where Tq_regenReq_1 is a portion of regeneration torque provided by the driveline to one electrically driven wheel and Tq_brkRegLow is the lower value of the right and left rear wheel regulation torques. The regeneration torque for the other electrically driven wheel is provided via the following equation:

$$Tq\_regenReq\_2=Tq\_brkRegLow+max((-1)*Tq\_eLSDpot,Tq\_diffReg)$$

where Tq_regenReq_2 is a portion of regeneration torque provided by the driveline to the other electrically driven wheel, Tq_brkRegLow is the lower value of the right and left rear wheel regulation torques, max is a function that provides a greater value of argument 1 (Tq_eLSDpot) or argument 2 (Tq_diffReg), Tq_eLSDPot is a maximum or upper threshold torque the electrically controlled limited slip differential may transfer, and Tq_diffReg is the difference in torque between the lower and higher regulation braking torques. The rear differential electric machine may be adjusted to provide the sum of Tq_regenReq_1 and Tq_regenReq_2.

The friction braking torque is provided according to the two following equations:

$$Tq\_fricReq\_1=0$$

$$Tq\_fricReq\_2=Tq\_brkRegHig-Tq\_regenReq\_2$$

where Tq_fricReq_1 is the friction braking torque of the wheel associated with the lower value of the right and left rear wheel regulation torques, Tq_fricReq2 is the friction braking torque of the wheel associated with the higher of the right and left rear wheel regulation torques, Tq_regenReq_2 is a portion of regeneration torque provided by the driveline to the other electrically driven wheel, and Tq_brkRegHig is the higher value of the right and left rear wheel regulation torques or the higher regulated braking torque.

It should be noted that Tq_regenReq_1 may apply to the left rear or right rear electrically driven wheel. Likewise, Tq_regenReq_2 may apply to the other of the left rear or right rear electrically driven wheel. For example, if Tq_brkRegLow is the regulation torque for the right rear wheel, Tq_brk RegHig is the regulation torque for the left rear wheel. Additionally, Tq_regenReq_1 applies to the right rear wheel and Tq_regenReq_2 applies to the left rear wheel when the lower value of the right and left rear wheel regulation torques applies to the right rear wheel. Tq_fricReq_1 then applies to the right rear wheel and Tq_fricReq_2 applies to the left rear wheel.

In this way, regeneration torques provided via the rear drive unit electric machine and friction braking torques provided via friction brakes may be determined and requested when there is capacity for regeneration torque to provide twice the value of the lower value of the right and left rear wheel regulation torques.

At 420, method 400 judges if slip of the left and right rear wheels is within a desired range. Alternatively or in addition, method 400 may judge if slip of the front wheels is in a desired range. In one example, the answer is yes if wheel slip of the left and right rear wheels is less than a threshold amount of slip. If the answer is yes, method 400 proceeds to exit. Otherwise, the answer is no and method 400 returns to 408.

At 418, method 400 determines the regenerative braking torques and the friction braking torques. Because the answer at step 414 was no, there is insufficient regenerative capacity to provide the requested braking level at the rear wheels without applying friction brakes. Method 400 adjusts a regenerative braking torque for one wheel using the following equation:

$$Tq\_regenReq\_1=Tq\_PwrLim*0.5$$

where Tq_regenReq_1 is a portion of regeneration torque provided by the driveline to one electrically driven wheel and Tq_PwrLim is the maximum or threshold regeneration power limit for the driveline. The regeneration torque for the other electrically driven wheel is provided via the following equation:

$$Tq\_regenReq\_2=Tq\_PwrLim*0.5$$

where Tq_regenReq_2 is a portion of regeneration torque provided by the driveline to the other electrically driven wheel.

The friction braking torque is provided according to the two following equations:

$$Tq\_fricReq\_1=Tq\_brkRegLow-Tq\_regenReq\_1$$

$$Tq\_fricReq\_2=Tq\_brkRegHig-Tq\_regenReq\_2$$

where Tq_fricReq_1 is the friction braking torque of the wheel associated with the lower value of the right and left rear wheel regulation torques, Tq_fricReq2 is the friction braking torque of the wheel associated with the higher of the right and left rear wheel regulation torques, Tq_regenReq_1 is half the power regeneration limit Tq_PwrLim, Tq_regenReq_2 is half the power regeneration limit Tq_PwrLim, Tq_brkRegLow is the lower value of the right and left rear wheel regulation torques, Tq_brkRegHig is the higher value of the right and left rear wheel regulation torques.

It should be noted that Tq_regenReq_1 may apply to the left rear or right rear electrically driven wheel. Likewise, Tq_regenReq_2 may apply to the other of the left rear or right rear electrically driven wheel.

In this way, regeneration torques provided via the rear drive unit electric machine and friction braking torques provided via friction brakes may be determined and requested when there is insufficient capacity for regeneration torque to provide the lower value of the right and left rear wheel regulation torques. Method 400 proceeds to 420.

At 440, method 400 determines the requested regenerative braking torque (e.g., torque produced via an electric machine while the electric machine is producing charge from the vehicle's kinetic energy) for the driveline electric machine or machines (Tq_regenReq). The requested regenerative braking torque for the electric machine may be determined via selecting the greater of the amount of a vehicle braking torque request (Tq_brkReq) and the greater amount of the regenerative torque limit or threshold responsive to battery charge (Tq_battChrgLim), the electric machine torque limit or threshold (Tq_mtrLim), and the regenerative torque limit or threshold responsive to vehicle stability conditions (Tq_vehSta). This may be mathematically expressed as:

$$Tq\_regenReq=max(Tq\_brkReq,max(Tq\_battChrgLim,Tq\_mtrLim,Tq\_vehSta))$$

where max is a function that outputs a value of the least negative (e.g., smallest magnitude of negative braking torques) of the arguments input to the function max. Note that the argument values are negative and indicated in the following example. For example, if Tq_brkReq=−650 Nm, Tq_battChrgLim=−400 Nm, Tq_mtrLim=−500 Nm, and Tq_vehSta=−340 Nm, the first use of the max (e.g., max (Tq_battChrgLim, Tq_mtrLim, Tq_vehSta) outputs a value of −340 Nm. The second use of the max function (e.g., max(Tq_brkReq, −340 Nm), where the −340 Nm is the output of the first use of the max function) outputs a value of −340 Nm providing the value of Tq_vehSta since the value of Tq_vehSta is a lower magnitude than −650 Nm.

The vehicle braking torque request may be determined from brake pedal position, the regenerative torque responsive to vehicle stability may be determined from a table of empirically determined values stored in non-transitory memory and referenced via a vehicle stability indicator (e.g., a yaw rate). The regenerative torque limit or threshold responsive to battery charge (Tq_battChrgLim) may also be determined via referencing or indexing a table of empirically determined values stored in controller memory according to battery state of charge. Method 400 proceeds to exit after determining the regenerative braking torque for the electric machine. The regenerative braking torque may apply to front and/or rear electrically driven wheels.

The entry condition for 430 is that wheel slip is detected at least at one non-driven wheel. At 430, method 400 provides friction braking to non-electrically driven wheels if present. In particular, torque of the non-driven wheels is adjusted to provide a wheel slip regulation torque. Method 400 proceeds to 432.

At 432, method 400 provides regenerative braking to electrically driven wheels. The regenerative braking torque Tq_regenReq may be provided via equation described at 440. Method 400 proceeds to exit.

Thus, the method of FIG. 4 provides for a vehicle operating method, comprising: reducing speed of a first wheel via regenerative braking and friction braking; and reducing the friction braking of the first wheel in response to slip of the first wheel without reducing the regenerative braking of the first wheel. In other examples, the friction braking and the regenerative braking of the first wheel may be reduced in response to slip of the first wheel, or when friction braking is not applied, only regenerative braking may be reduced. The method further comprises reducing speed of a second wheel via regenerative braking and friction braking, and maintaining the regenerative braking and the friction braking of the second wheel while reducing friction braking of the first wheel. The method includes where the regenerative braking is provided via a rear drive unit electric machine. The method includes where the regenerative braking is provided via a front drive unit electric machine. The method further comprises reducing the regenerative braking of the first wheel in response to slip of the first wheel and absence of friction braking of the first wheel. The method includes where the first wheel is a rear wheel and where the regenerative braking is provided via a rear drive unit electric machine. The method further comprises regulating braking torque of non-driven wheels via friction braking.

The method of FIG. 4 also provides for a driveline operating method, comprising: adjusting friction braking torque of a first wheel to zero and friction braking torque of a second wheel to a non-zero value in response to a driveline power regeneration limit being greater than a threshold value; and adjusting regenerative braking torque of the first wheel and regenerative braking torque of the second wheel to non-zero values in response to the driveline power regeneration limit being greater than the threshold value while adjusting the friction braking torque of the first wheel and the second wheel. The method includes where the threshold value is a lower value of a brake regulation torque of the first wheel and a brake regulation torque of the second wheel. The method includes where the regenerative braking torque of the second wheel is based on a differential clutch torque. The method further comprises adjusting the friction braking torque of the first wheel and the regenerative braking torque of the first wheel while at least one wheel of a vehicle is slipping greater than a threshold amount. The method includes where the regenerative braking torque of the second wheel is adjusted in further response to a difference between two torque values. The method includes where the difference in torque values is a difference between a torque of the first wheel and a torque of the second wheel. The method further comprises adjusting a rear drive unit to provide the regenerative torque of the first wheel and the regenerative torque of the second wheel.

The method of FIG. 4 also provides for a driveline operating method, comprising: adjusting friction braking torque of a first wheel to a non-zero value and friction braking torque of a second wheel to a non-zero value in response to a driveline power regeneration limit being less than a threshold value; and adjusting regenerative braking torque of the first wheel to half a driveline regeneration power limit and regenerative braking torque of the second wheel to half the driveline regeneration power limit in response to the driveline power regeneration limit being less than the threshold value. The method includes where the threshold value is a lower value of a brake regulation torque of the first wheel and a brake regulation torque of the second wheel. The method includes where the friction braking torque of the first wheel is adjusted responsive to the regenerative braking torque of the first wheel. The method includes where the friction braking torque of the second wheel is adjusted responsive to the regenerative braking torque of the second wheel. The method includes where the friction braking torque of the first wheel is adjusted responsive to a braking regulation torque of the first wheel. The method includes where the friction braking torque of the second wheel is adjusted to a braking regulation torque of the second wheel.

Referring now to FIG. 5, a prophetic operating sequence according to the method of FIG. 4 is shown. The vehicle operating sequence shown in FIG. 5 may be provided via the method of FIG. 4 in cooperation with the system shown in FIGS. 1A-3. The plots shown in FIG. 5 occur at the same time and are aligned in time.

The first plot from the top of FIG. 5 is a plot of requested braking torque amount versus time. The vertical axis represents an amount of requested braking torque and the requested braking torque amount may be determined from brake pedal position or a level of a controller input (e.g., a voltage level). The braking torque request is zero when the trace is near the horizontal axis. The braking torque request magnitude increases in the direction of the vertical axis arrow. The horizontal axis represents time and time increases from the left side of the figure to the right side of the figure.

The second plot from the top of FIG. 5 is a plot of rear right wheel slip versus time. The vertical axis represents rear right wheel slip and the amount of wheel slip increases in the direction of the vertical axis arrow. The horizontal axis represents time and time increases from the left side of the figure to the right side of the figure. Horizontal line 504 represents a threshold wheel slip amount. Horizontal line 502 represents a threshold wheel slip amount. Wheel slip is indicated when the trace is above the level of horizontal line 502.

The third plot from the top of FIG. 5 is a plot of rear left wheel slip versus time. The vertical axis represents rear left wheel slip and the amount of wheel slip increases in the direction of the vertical axis arrow. The horizontal axis represents time and time increases from the left side of the figure to the right side of the figure. Wheel slip is indicated when the trace is above the level of horizontal line 504.

The fourth plot from the top of FIG. 5 is a plot of regenerative braking torque applied to the rear right wheel via the rear drive unit electric machine versus time. The vertical axis represents regenerative braking torque for the rear right wheel and the magnitude of the regenerative braking torque increases in the direction of the vertical axis arrow. The horizontal axis represents time and time increases from the left side of the figure to the right side of the figure. Horizontal line 506 represents a threshold or maximum regenerative braking amount.

The fifth plot from the top of FIG. 5 is a plot of regenerative braking torque applied to the rear left wheel via the rear drive unit electric machine versus time. The vertical axis represents regenerative braking torque for the rear left wheel and the magnitude of the regenerative braking torque increases in the direction of the vertical axis arrow. The horizontal axis represents time and time increases from the left side of the figure to the right side of the figure. Horizontal line 508 represents a threshold or maximum regenerative braking amount.

The sixth plot from the top of FIG. 5 is a plot of rear right friction braking torque versus time. The vertical axis represents right rear friction braking torque and right rear friction braking torque magnitude increases in the direction of the vertical axis down arrow. The horizontal axis represents time and time increases from the left side of the figure to the right side of the figure.

The seventh plot from the top of FIG. 5 is a plot of real left wheel friction braking torque versus time. The vertical axis represents rear left wheel friction braking torque and the magnitude of rear left friction braking torque increases in the direction of the vertical axis arrow. The horizontal axis represents time and time increases from the left side of the figure to the right side of the figure.

The horizontal axis of each plot corresponds to a value of zero for the vertical axis unless otherwise noted. Further, the vertical axis of each plot corresponds to a value of zero time. In this example, the rear right and left wheels may be slowed via friction braking torque and/or regenerative braking torque.

At time T0, the requested braking torque is zero and the rear right and left wheels are not slipping. The regenerative braking torque for the rear right and left wheels is also zero and the rear right and left friction brakes are not applied.

At time T1, the driver (not shown) applies the brake pedal (not shown) to increase the magnitude of the requested braking torque. The magnitude of the rear right and left regeneration torques increase in response to the increase in magnitude of the requested braking torque. The amount of slip for the rear right and left wheels begins to increase as the magnitude of the rear right and left regeneration torque increases. The rear right friction brake and the left rear friction brakes are not applied. A greater magnitude total of braking torque (e.g., regenerative braking torque plus friction braking torque) is applied to the rear left wheel than to the rear right wheel. The rear left wheel may accept a greater magnitude braking torque without exhibiting wheel slip during conditions when a greater normal force is applied to the rear left wheel than the rear right wheel (e.g., during a right turn).

Between time T1 and time T2, the requested amount of braking torque remains constant and the amount of wheel slip of the right rear wheel exceeds threshold 502 so that the regenerative braking torque provided to the rear right wheel is reduced. The rear left wheel slip does not exceed threshold 504 and the rear left wheel regenerative braking torque is maintained. The friction braking torque of the right rear wheel and the left rear wheel remain zero.

At time T2, the regenerative braking torque of the rear right wheel is returned to level 506 once slip is under control. The slip of the left rear wheel remains less than threshold 504 and regenerative braking torque applied to the rear left wheel remains constant and near level 508. Friction braking torque is not applied to the rear right wheel and a small amount of friction braking torque continues to be supplied to the rear left wheel.

At time T3, the vehicle driver releases the brake pedal (not shown) and the requested braking torque is changed to zero. The rear right wheel slip and the rear left wheel slip change to zero. The rear right wheel regenerative braking torque magnitude is reduced to zero and the rear left wheel regenerative braking torque magnitude is reduced to zero. The rear left and right friction brake torques are also changed to zero in response to the reduction of requested braking torque.

At time T4, the driver (not shown) applies the brake pedal (not shown) a second time to increase the magnitude of the requested braking torque. The magnitude of the requested braking torque is significantly greater than the magnitude of the requested braking torque at time T1. The magnitude of the rear right and left regeneration torques increase in response to the increase in magnitude of the requested braking torque. The rear right wheel regenerative braking torque is adjusted to the level of threshold 506. The rear left wheel regenerative braking torque is adjusted to the level of threshold 508. The amount of slip for the rear right and left wheels begins to increase as the magnitude of the rear right and left regeneration torque increases. Both the rear right friction brake and the rear left friction brake are applied in significant amounts.

At time T5, slip of the rear left wheel exceeds threshold 504 and slip of the rear right wheel remains less than threshold 502. The slip of the rear left wheel may increase due to the vehicle negotiating a left turn while the braking torque request is high. The regeneration wheel torque for the rear right and left wheels remain at the levels of thresholds 506 and 508. However, the rear left wheel friction torque is reduced to reduce the slip of the rear left wheel. Further, by reducing rear left wheel friction torque instead of rear left wheel regenerative braking torque, a high level of regenerative braking torque may be provided so that a larger amount of the vehicle's kinetic energy may be stored as electrical energy. The rear right wheel friction braking amount remains constant since the rear right wheel is not slipping.

Between time T5 and time T6, the requested amount of braking torque remains constant and the amount of wheel slip of the rear left wheel continues to exceed threshold 502 so that the rear left wheel friction braking torque continues to be reduced. Slip of the rear right wheel remains less than level 502 and rear right friction brake torque continues at its previous level. Regenerative braking torque for the rear right and left wheels remains at a constant level.

At time T6, the slip of the rear left wheel is decreased to less than threshold 504 and rear left wheel friction braking torque is returned to its previous level before slip occurred. The requested braking torque remains at its previous level and the rear right wheel slip is less than threshold 502. The regenerative braking torque for the rear right wheel continues at the threshold level 506 and the regenerative braking torque for the rear left wheel continues at the threshold level 508. The rear right friction braking torque is maintained at its previous level.

At time T7, the vehicle driver releases the brake pedal (not shown) and the requested braking torque is changed to zero. The rear right wheel slip and the rear left wheel slip change to zero. The rear right wheel regenerative braking torque magnitude is reduced to zero and the rear left wheel regenerative braking torque magnitude is reduced to zero. The rear left and right friction brake torques are also changed to zero in response to the reduction of requested braking torque.

In this way, regenerative braking torque and friction braking torque may be controlled during conditions of wheel slip. If both regenerative braking and friction braking is applied to a wheel and the wheel slips, the friction braking may be first reduced so that the vehicle's kinetic energy may continue to be stored. If only regenerative braking is applied to a slipping wheel, the regenerative braking may be reduced to control wheel slip.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
reducing speed of a first wheel via regenerative braking and friction braking; and
reducing the friction braking of the first wheel in response to a slip of the first wheel greater than a slip threshold without reducing the regenerative braking of the first wheel, to reduce the slip of the first wheel to below the slip threshold.

2. The method of claim 1, further comprising reducing speed of a second wheel via regenerative braking and friction braking, and maintaining the regenerative braking and the friction braking of the second wheel while reducing the friction braking of the first wheel.

3. The method of claim 1, where the regenerative braking is provided via a rear drive unit electric machine.

4. The method of claim 1, where the regenerative braking is provided via a front drive unit electric machine.

5. The method of claim 1, further comprising reducing the regenerative braking of the first wheel in response to the slip of the first wheel and absence of the friction braking of the first wheel.

6. The method of claim 1, where the first wheel is a rear wheel and where the regenerative braking is provided via a rear drive unit electric machine.

7. The method of claim 1, further comprising regulating braking torque of non-driven wheels via friction braking.

8. A driveline operating method for a vehicle, comprising:
adjusting friction braking torque of a first wheel to zero and friction braking torque of a second wheel to a non-zero value in response to a driveline power regeneration limit being greater than or equal to a threshold value; and
adjusting regenerative braking torque of the first wheel and regenerative braking torque of the second wheel to non-zero values in response to the driveline power regeneration limit being greater than or equal to the threshold value while adjusting the friction braking torque of the first wheel and the second wheel, where the first wheel and the second wheel are rear wheels of the vehicle.

9. The method of claim 8, where the threshold value is based on a brake regulation value.

10. The method of claim 8, where the regenerative braking torque of the second wheel is based on a differential clutch torque.

11. The method of claim 8, further comprising adjusting the friction braking torque of the first wheel and the regenerative braking torque of the first wheel while at least one wheel of the vehicle is slipping greater than a threshold amount.

12. The method of claim 8, where the regenerative braking torque of the second wheel is adjusted in further response to a difference between two torque values.

13. The method of claim 12, where the difference in torque values is a difference between a torque of the first wheel and a torque of the second wheel.

14. The method of claim 8, further comprising adjusting a rear drive unit to provide the regenerative braking torque of the first wheel and the regenerative braking torque of the second wheel.

15. A driveline operating method, comprising:
adjusting friction braking torque of a first wheel to a non-zero value and friction braking torque of a second wheel to a non-zero value in response to a driveline power regeneration limit being less than a threshold value, the driveline power regeneration limit a function of a state of charge of a battery and a temperature of an electric machine; and
adjusting regenerative braking torque of the first wheel to half the driveline regeneration power limit and regenerative braking torque of the second wheel to half the driveline regeneration power limit in response to the driveline power regeneration limit being less than the threshold value, where the first wheel and the second wheel are rear wheels of a vehicle.

16. The method of claim 15, where the threshold value is based on a brake regulation value.

17. The method of claim 15, where the friction braking torque of the first wheel is adjusted responsive to the regenerative braking torque of the first wheel.

18. The method of claim 15, where the friction braking torque of the second wheel is adjusted responsive to the regenerative braking torque of the second wheel.

19. The method of claim 15, where the friction braking torque of the first wheel is adjusted responsive to a braking regulation torque of the first wheel.

20. The method of claim 15, where the friction braking torque of the second wheel is adjusted to a braking regulation torque of the second wheel.

* * * * *